(12) United States Patent
Thomas et al.

(10) Patent No.: US 10,471,507 B2
(45) Date of Patent: Nov. 12, 2019

(54) METHODS OF FABRICATING CERAMIC OR INTERMETALLIC PARTS

(71) Applicant: Halliburton Energy Services, Inc., Houston, TX (US)

(72) Inventors: Jeffrey G. Thomas, Magnolia, TX (US); Grant O. Cook, III, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 419 days.

(21) Appl. No.: 14/909,889

(22) PCT Filed: Apr. 24, 2015

(86) PCT No.: PCT/US2015/027495
§ 371 (c)(1),
(2) Date: Feb. 3, 2016

(87) PCT Pub. No.: WO2016/171715
PCT Pub. Date: Oct. 27, 2016

(65) Prior Publication Data
US 2017/0050241 A1    Feb. 23, 2017

(51) Int. Cl.
*E21B 10/54* (2006.01)
*B22F 3/105* (2006.01)
(Continued)

(52) U.S. Cl.
CPC .......... *B22F 3/1055* (2013.01); *B22F 3/1143* (2013.01); *B22F 3/26* (2013.01); *B22F 7/08* (2013.01); *B23K 15/0086* (2013.01); *B23K 26/342* (2015.10); *B23K 26/70* (2015.10); *B33Y 10/00* (2014.12); *B33Y 40/00* (2014.12);
(Continued)

(58) Field of Classification Search
CPC ........ E21B 10/42; E21B 10/54; B22F 3/1055; B22F 3/26; B22F 3/1143; B22F 7/08; B22F 2003/241; B22F 2005/001; B22F 2998/10; C04B 41/009; C04B 41/51; C04B 41/88; C22C 1/0491; C22C 1/0475; C22C 29/00; C22C 32/0005; C23C 8/48; C23C 8/80; C23C 8/68; C23C 8/64; C23C 8/16; C23C 8/12; C23C 10/06; C23C 8/24; C23C 8/20; B23K 26/342; B23K 15/0086;
(Continued)

(56) References Cited

U.S. PATENT DOCUMENTS 6,200,514 B1   3/2001   Meister
2004/0173335 A1   9/2004   Schaffer et al.
(Continued)

FOREIGN PATENT DOCUMENTS

WO   03080991 A1   10/2003

OTHER PUBLICATIONS

International Search Report and Written Opinion for PCT/US2015/027495 dated Jan. 7, 2016.

*Primary Examiner* — Brad Harcourt
(74) *Attorney, Agent, or Firm* — Alan Bryson; C. Tumey Law Group PLLC (57) ABSTRACT

A part includes a three-dimensional porous metallic workpiece printed via an additive manufacturing process and subsequently subjected to a diffusion-based process to convert at least a portion of the porous metallic workpiece to a ceramic workpiece or an intermetallic workpiece.

11 Claims, 8 Drawing Sheets

(51) Int. Cl.
| | |
|---|---|
| E21B 10/42 | (2006.01) |
| B33Y 80/00 | (2015.01) |
| B33Y 10/00 | (2015.01) |
| B33Y 40/00 | (2015.01) |
| B23K 26/342 | (2014.01) |
| B23K 26/70 | (2014.01) |
| B22F 3/11 | (2006.01) |
| B22F 3/26 | (2006.01) |
| B22F 7/08 | (2006.01) |
| B23K 15/00 | (2006.01) |
| C23C 8/12 | (2006.01) |
| C23C 8/16 | (2006.01) |
| C23C 8/20 | (2006.01) |
| C23C 8/24 | (2006.01) |
| C23C 8/64 | (2006.01) |
| C23C 8/68 | (2006.01) |
| C23C 8/80 | (2006.01) |
| C23C 10/06 | (2006.01) |
| C23C 10/60 | (2006.01) |
| C04B 41/88 | (2006.01) |
| C04B 41/00 | (2006.01) |
| C04B 41/51 | (2006.01) |
| C23C 8/48 | (2006.01) |
| C22C 1/04 | (2006.01) |
| B23K 101/00 | (2006.01) |
| B22F 3/24 | (2006.01) |
| B22F 5/00 | (2006.01) |
| C22C 29/00 | (2006.01) |
| C22C 32/00 | (2006.01) |

(52) U.S. Cl.
CPC ............ *B33Y 80/00* (2014.12); *C04B 41/009* (2013.01); *C04B 41/51* (2013.01); *C04B 41/88* (2013.01); *C22C 1/0475* (2013.01); *C22C 1/0491* (2013.01); *C23C 8/12* (2013.01); *C23C 8/16* (2013.01); *C23C 8/20* (2013.01); *C23C 8/24* (2013.01); *C23C 8/48* (2013.01); *C23C 8/64* (2013.01); *C23C 8/68* (2013.01); *C23C 8/80* (2013.01); *C23C 10/06* (2013.01); *C23C 10/60* (2013.01); *E21B 10/42* (2013.01); *B22F 2003/241* (2013.01); *B22F 2005/001* (2013.01); *B22F 2998/10* (2013.01); *B23K 2101/002* (2018.08); *C22C 29/00* (2013.01); *C22C 32/0005* (2013.01); *E21B 10/54* (2013.01); *Y02P 10/295* (2015.11)

(58) Field of Classification Search
CPC .. B23K 26/70; B23K 2201/002; B33Y 10/00; B33Y 40/00; B33Y 80/00
See application file for complete search history.

(56) References Cited

U.S. PATENT DOCUMENTS

| | | | |
|---|---|---|---|
| 2005/0207929 A1 | 9/2005 | Yamada | |
| 2006/0231293 A1* | 10/2006 | Ladi | B22D 19/06 175/374 |
| 2009/0218098 A1* | 9/2009 | Tibbitts | E21B 7/18 166/298 |
| 2012/0298323 A1 | 11/2012 | Thomas et al. | |
| 2013/0316149 A1 | 11/2013 | Atkins et al. | |
| 2013/0320598 A1 | 12/2013 | Atkins et al. | |
| 2014/0087210 A1 | 3/2014 | Keane et al. | |
| 2016/0175933 A1* | 6/2016 | Li | C04B 35/62231 419/2 |

* cited by examiner

METHODS OF FABRICATING CERAMIC OR INTERMETALLIC PARTS

BACKGROUND

Additive manufacturing (e.g., 3D printing) can provide certain advantages over traditional manufacturing processes. For manufacturing drill bits used in the oil and gas industry, for example, one of the most significant advantages of additive manufacturing is the design flexibility and the ability to create forms and features not feasible any other way. Similar advantages of additive manufacturing are applicable to other industries. Additive manufacturing systems, such as direct metal laser sintering or electron-beam melting, are currently available for fabricating or "printing" metal components. Printing ceramic materials via additive manufacturing, however, poses significant challenges.

In general, ceramic materials are bonded together using water or a binding agent, such as a polymer or a metal. The bonded structure is then fired using conventional ceramic processing steps to convert the bonded structure to a ceramic. In additive manufacturing, it is difficult to bond or melt ceramic particles to build up an additive manufactured structure due to the high melting temperature of the ceramic particles. Moreover, ceramics particles are brittle and therefore sensitive to thermal stresses common to additive manufacturing as each successive layer is melted or sintered and cooled to build up the desired structure or part.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure relates to part manufacturing and, more particularly, to fabricating ceramic or intermetallic parts using additive manufacturing.

Embodiments described herein provide processes or methods that allow ceramic or intermetallic materials to be fabricated using additive manufacturing techniques. The presently disclosed methods may be used, for example, to print a three-dimensional porous metallic workpiece via an additive manufacturing process. The porous metallic workpiece is subsequently subjected to a diffusion-based process to convert at least a portion of the porous metallic workpiece to a ceramic workpiece or an intermetallic workpiece. Burnout of binding agents typically included in a ceramic is not necessary since the resulting ceramic or intermetallic structure is initially produced as a metallic structure or workpiece, after which a suitable diffusion-based process transforms the metallic workpiece in situ to a ceramic or intermetallic. In one specific embodiment, a part may be manufactured by printing and carburizing a tungsten structure resulting in a tungsten carbide structure, such as a drill bit or a drill bit component, which may subsequently be infiltrated to form a tungsten carbide metal-matrix composite. It will be appreciated that many different shapes and structures are possible beyond those common to particle production methods, foam production methods, and resulting structures of packed powder.

The principles of the present disclosure may be applied to manufacturing tools or parts commonly used in the oil and gas industry for the exploration and recovery of hydrocarbons. Such tools and parts include, but are not limited to, oilfield drill bits or cutting tools (e.g., fixed-angle drill bits, roller-cone drill bits, coring drill bits, bi-center drill bits, impregnated drill bits, reamers, stabilizers, hole openers, cutters), non-retrievable drilling components, aluminum drill bit bodies associated with casing drilling of wellbores, drill-string stabilizers, cones for roller-cone drill bits, models for forging dies used to fabricate support arms for roller-cone drill bits, arms for fixed reamers, arms for expandable reamers, internal components associated with expandable reamers, sleeves attached to an uphole end of a rotary drill bit, rotary steering tools, logging-while-drilling tools, measurement-while-drilling tools, side-wall coring tools, fishing spears, washover tools, rotors, stators and/or housings for downhole drilling motors, blades and housings for downhole turbines, and other downhole tools having complex configurations and/or asymmetric geometries associated with forming a wellbore.

It will be appreciated, however, that the principles of the present disclosure may be equally be applied to manufacturing tools or parts used in any other industry or field that may benefit from the fabrication of ceramic or intermetallic parts. For instance, the methods described herein may be applied to fabricating armor plating, automotive components (e.g., sleeves, cylinder liners, driveshafts, exhaust valves, brake rotors), bicycle frames, brake fins, aerospace components (e.g., landing-gear components, structural tubes, struts, shafts, links, ducts, waveguides, guide vanes, rotor-blade sleeves, ventral fins, actuators, exhaust structures, cases, frames, fuel nozzles), turbopump components, a screen, a filter, and a porous catalyst, without departing from the scope of the disclosure. Those skilled in the art will readily appreciate that the foregoing list is not a comprehensive listing, but only exemplary. Accordingly, the foregoing listing of parts and/or components should not be limiting to the scope of the present disclosure.

As used herein, the term "part" refers to any tool, part, component, or structure that may benefit from being manufactured as a ceramic or intermetallic, either in its entirety or in part. It should be noted that the shape, configuration, design, or size of the part fabricated using the principles or methods described herein is only limited by the selected additive manufacturing process used to fabricate the desired part. For instance, a ceramic or intermetallic part produced by additive manufacturing and the principles disclosed herein may take a variety of forms, such as a completed part, a porous network that is subsequently infiltrated or filled in to form a metal-matrix or ceramic-matrix composite, or various components or reinforcement formats that may be used to reinforce a composite material. Examples of the ceramic or intermetallic material formed by additive manufacturing include powders, mesoscale structures, and building-block components to be used in creating larger structures. Examples of suitable composite materials include sites, and the like. Such ceramic or intermetallic components may be used to reinforce metals, alloys, or metal-matrix composites such that the parts become suitable replacements for oxide dispersion-strengthened alloys. Furthermore, the production of ceramic-matrix composites using such ceramic or intermetallic components may produce additional strengthening in a porous network of mesoscale structures that is not achievable by the conventional fiber-reinforcement method. The principles disclosed herein can also be employed to create ceramic parts where an open porous structure is required such as a filter, a screen, a catalyst, and the like.

Intermetallics are generally classified in two groups: stoichiometric and non-stoichiometric. Stoichiometric intermetallics, such as $Al_3Ni$, have a fixed composition (e.g., a vertical line on a phase diagram) and, similar to ceramic materials, are generally very hard, strong, and brittle. Non-stoichiometric intermetallics, such as AlNi, occur over a range of compositions and are generally more ductile than stoichiometric intermetallics. As a result, non-stoichiometric intermetallics provide intermediate properties between those of ceramics and stoichiometric intermetallics and those of pure metals and solid-solution alloys. More particularly, stoichiometric intermetallic structures provide enhanced stiffness and strength, similar to ceramics, whereas non-stoichiometric intermetallic structures provide intermediate reinforcing properties (e.g., still stiffer than matrix materials, that is to say, binder or alloy materials, but with some ductility compared to ceramic and stoichiometric intermetallic materials).

Figure 1:
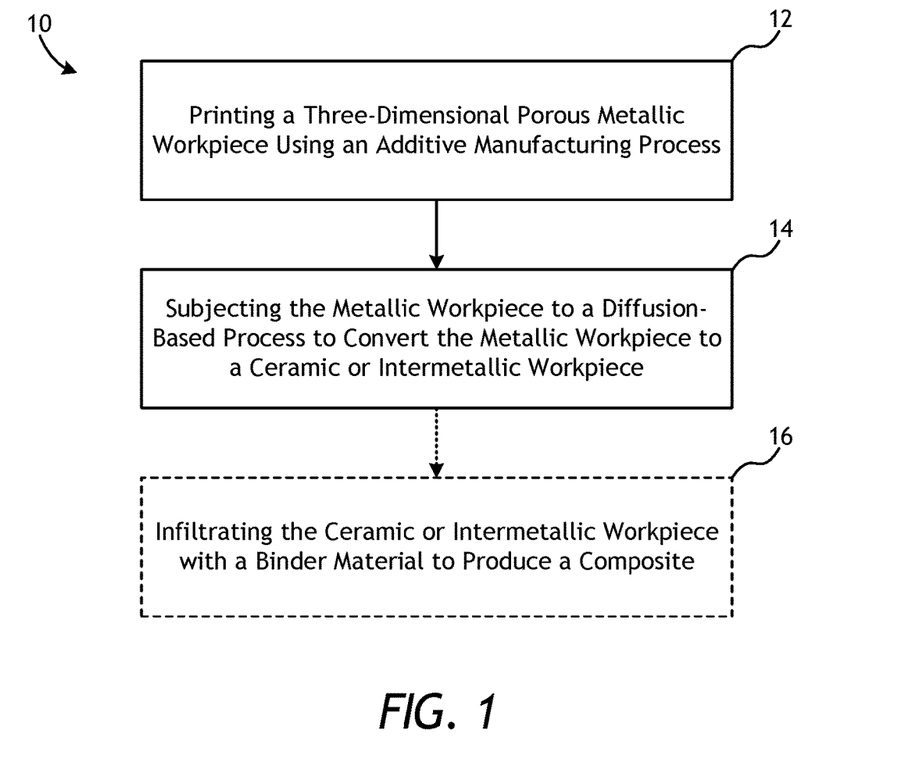
FIG. 1 is a schematic flowchart of an exemplary method of fabricating a part.

Referring to FIG. 1, illustrated is a schematic flowchart of an exemplary method 10 of fabricating a part, according to one or more embodiments. The method 10 may include printing a three-dimensional porous metallic workpiece using an additive manufacturing process, as at 12. The additive manufacturing process (e.g., 3D printing) may include, but is not limited to, laser sintering (LS) [e.g., selective laser sintering (SLS), direct metal laser sintering (DMLS)], laser melting (LM) [e.g., selective laser melting (SLM), lasercusing], electron-beam melting (EBM), laser metal deposition [e.g., direct metal deposition (DMD), laser engineered net shaping (LENS), directed light fabrication (DLF), direct laser deposition (DLD), direct laser fabrication (DLF), laser rapid forming (LRF), laser melting deposition (LMD)], any combination thereof, and the like. The resulting metallic workpiece may be printed to any desired shape, configuration, design, or size to correspond to the specific part being fabricated.

The metallic workpiece may be made out of any base metal or base metal alloy that can form a carbide, a nitride, a boride, an oxide, a silicide, or an intermetallic upon being subjected to appropriate conditions. Carbides may be formed by using aluminum, boron, calcium, cerium, chromium, erbium, iron, hafnium, lanthanum, lithium, magnesium, manganese, molybdenum, niobium, praseodymium, scandium, silicon, tantalum, titanium, vanadium, tungsten, yttrium, ytterbium, and zirconium. Nitrides may be formed by using aluminum, boron, calcium, cerium, cobalt, chromium, iron, gallium, hafnium, indium, lithium, magnesium, manganese, molybdenum, niobium, nickel, scandium, silicon, tantalum, titanium, vanadium, tungsten, yttrium, and zirconium. Borides may be formed by using aluminum, barium, beryllium, calcium, cerium, cobalt, chromium, dysprosium, erbium, europium, iron, gadolinium, hafnium, holmium, lanthanum, lithium, lutetium, magnesium, manganese, molybdenum, niobium, neodymium, nickel, osmium, palladium, praseodymium, platinum, rhenium, rhodium, ruthenium, scandium, samarium, strontium, tantalum, terbium, titanium, thulium, vanadium, tungsten, yttrium, ytterbium, and zirconium. Oxides may be formed by using aluminum, barium, beryllium, bismuth, calcium, cadmium, cerium, cobalt, chromium, cesium, copper, erbium, iron, gallium, germanium, hafnium, indium, potassium, lanthanum, lithium, magnesium, manganese, molybdenum, sodium, niobium, neodymium, nickel, lead, praseodymium, rubidium, antimony, scandium, silicon, tin, strontium, tantalum, terbium, tellurium, titanium, vanadium, tungsten, yttrium, zinc, and zirconium. Silicides may be formed by using barium, boron, calcium, cerium, cobalt, chromium, dysprosium, erbium, iron, gadolinium, hafnium, holmium, iridium, lanthanum, lithium, lutetium, magnesium, manganese, molybdenum, niobium, neodymium, nickel, osmium, palladium, praseodymium, platinum, rhenium, rhodium, ruthenium, scandium, samarium, strontium, tantalum, terbium, tellurium, titanium, thulium, vanadium, tungsten, yttrium, ytterbium, and zirconium.

Intermetallics (both stoichiometric and non-stoichiometric) may be formed by using at least two metallic elements that form intermetallic compounds. In addition to the ceramic materials already listed herein, examples of elements that form refractory aluminum-based intermetallics include cobalt, chromium, copper, iron, hafnium, iridium, manganese, molybdenum, niobium, nickel, palladium, platinum, rhenium, ruthenium, scandium, tantalum, titanium, vanadium, tungsten, and zirconium. Other examples of refractory intermetallic systems include silver-titanium, silver-zirconium, gold-hafnium, gold-manganese, gold-niobium, gold-scandium, gold-tantalum, gold-titanium, gold-thulium, gold-vanadium, gold-zirconium, beryllium-copper, beryllium-iron, beryllium-niobium, beryllium-nickel, beryllium-palladium, beryllium-titanium, beryllium-vanadium, beryllium-tungsten, beryllium-zirconium, any combination thereof, and the like. This skilled in the art will readily appreciate that the principles of the present disclosure can apply to several other potential intermetallics not listed herein, without departing from the scope of the disclosure.

Suitable base metals that may be used to form the metallic workpiece and subsequently form a carbide, a nitride, a boride, an oxide, a silicide, or an intermetallic include, but are not limited to, any element from any of the foregoing lists. Suitable base metal alloys that may be used to form the metallic workpiece and subsequently form a carbide, a nitride, a boride, an oxide, a suicide, or an intermetallic include, but are not limited to, any alloy wherein the most prevalent element, when measured by weight, is from one of the foregoing lists.

Once printed, the porous metallic workpiece may then be subjected to a diffusion-based process to convert at least a portion of the metallic workpiece to a ceramic or intermetallic workpiece, as at 14. Suitable diffusion-based processes include, but are not limited to, carburizing, nitriding, bonding, and oxidizing, all of which may convert the metallic workpiece into a desired ceramic or intermetallic composition. During the diffusion-based process, some or all of the metallic workpiece may be subjected to a reaction atmosphere comprising any capable media that may result in the production of a ceramic (e.g., an oxide, a carbide, a boride, a nitride, a silicide) or an intermetallic material (e.g., AlNi, TiAl). Suitable media includes, but is not limited to, methane, air, oxygen, endogas, exogas, nitrogen, ammonia, charcoal, carbon, graphite, nitriding salts, boron, silicon, vaporized metal (i.e., gas), molten metal, or any combination thereof.

As will be appreciated, the porosity of the metallic workpiece may allow the media of the reaction atmosphere to access some or all of the internals of the metallic workpiece and thereby react with and diffuse into all desired regions thereof. In some embodiments, the metallic workpiece may be printed such that the porosity is relatively low in select regions or throughout all of the metallic workpiece. Such embodiments may result in a ceramic or intermetallic part that may be more ductile (e.g., still metallic) at its core or in selected regions. For instance, in such embodiments, the media of the reaction atmosphere may be unable to access and react with the center of the metallic workpiece, thereby resulting in a part that is more ductile at its core. In other embodiments, portions of the metallic workpiece may be masked off such that the media of the reaction atmosphere is unable to access the masked-off portions and a ceramic or intermetallic material will, therefore, not result at those regions. In yet other embodiments, the diffusion-based process may be terminated prematurely such that the media of the reaction atmosphere is unable to completely react with all portions of the metallic workpiece, thereby also potentially resulting in a ductile core, such as is done in case-hardening applications. Furthermore, in certain cases a gradient of materials (e.g., alloys, intermetallics, and ceramics) may result from the process, thereby producing a functional gradient of properties. As an example, a Ni core may remain with a NiAl intermediate layer and a $NiAl_3$ outer layer.

The diffusion-based process may be conducted at an elevated temperature within a furnace, for example. The furnace used to conduct the diffusion-based process may comprise a continuous or batch furnace capable of operating with the desired media of the reaction atmosphere. Suitable furnaces include, but are not limited to, a belt furnace, a vacuum furnace, a muffle furnace, a retort furnace, any combination thereof, and the like.

In some embodiments, the diffusion-based process may incorporate the use of a liquid-metal bath. More particularly, the liquid-metal bath may be useful in reacting constituents together to create the ceramic or intermetallic part. In such embodiments, the metallic workpiece may be immersed in a liquid-metal bath to create the ceramic or intermetallic part. As an example, in an embodiment where the metallic workpiece is manufactured from a nickel-based metal, the nickel-based workpiece may be immersed in an aluminum bath to produce an intermetallic, such as $AlNi_3$, AlNi, $Al_3Ni_2$, or $Al_3Ni$. As noted above, this process may be carried to completion to completely transform the Ni to an intermetallic composition, or it may be carried to an intermediate stage that may produce one of these intermetallic phases throughout the part or a functional gradient of phases (and properties), depending on the time and temperature cycle of the diffusion-based process.

As will be appreciated, the method 10 may prove advantageous in fabricating parts from several commonly used ceramic or intermetallic material systems. Tungsten carbide (WC), for example, is commonly used in the oil and gas industry to fabricate hard and erosion-resistant parts. According to the present disclosure, WC parts may be fabricated using the method 10. In such embodiments, a porous tungsten metallic workpiece may first be printed using additive manufacturing to a desired size and shape, as at 12. In at least one embodiment, the porous tungsten metallic workpiece may comprise a plurality of mesoscale reinforcement components. The printed tungsten metallic workpiece may then be carburized via the above-described diffusion-based processes to provide a WC part, as at 14. Other material systems that may be produced using the method 10 include, but are not limited to, $Al_2O_3$, AlN, BN, $B_4C$, $CrB_2$, $Cr_2C_3$, NbC, SiC, $Si_3N_4$, $TiB_2$, TiC, TiN, Ti(C, N), VC, MgO, $Y_2O_3$, or any carbide, oxide, boride, nitride, silicide or any intermetallic compound in which at least one metallic component of the resulting intermetallic or ceramic is capable of being printed using additive manufacturing.

Still referring to FIG. 1, in some embodiments, the method 10 may optionally and further include infiltrating the ceramic or intermetallic workpiece with a binder material to produce a composite, as at 16. Example composites include metal-matrix, ceramic-matrix, and polymer-matrix composites. A metal-matrix composite (MMC) is generally made from a reinforcement material that is infiltrated with a binder or infiltration or matrix material. In the present embodiment, the ceramic or intermetallic workpiece may comprise the reinforcement material, and the binder material may include, but is not limited to, copper, nickel, cobalt, iron, aluminum, molybdenum, chromium, manganese, tin, zinc, lead, silicon, tungsten, boron, phosphorous, gold, silver, palladium, indium, titanium, vanadium, zirconium, niobium, hafnium, tantalum, rhenium, ruthenium, osmium, iridium, any mixture thereof, any alloy thereof, and any combination thereof.

The infiltration process may include placing the ceramic or intermetallic workpiece and the binder material into a furnace. In some embodiments, the ceramic or intermetallic workpiece and the binder material may be deposited in a container or a mold prior to being introduced into the furnace. When the furnace temperature reaches the melting point of the binder material, the binder material will liquefy and proceed to infiltrate the porous network of the ceramic or intermetallic workpiece. After a predetermined amount of time allotted for the liquefied binder material to infiltrate the porous network of the ceramic or intermetallic workpiece, the resulting composite may then be removed from the furnace and cooled at a controlled rate. The resulting composite may be a sealed or solid composite part or tool.

Figure 2:
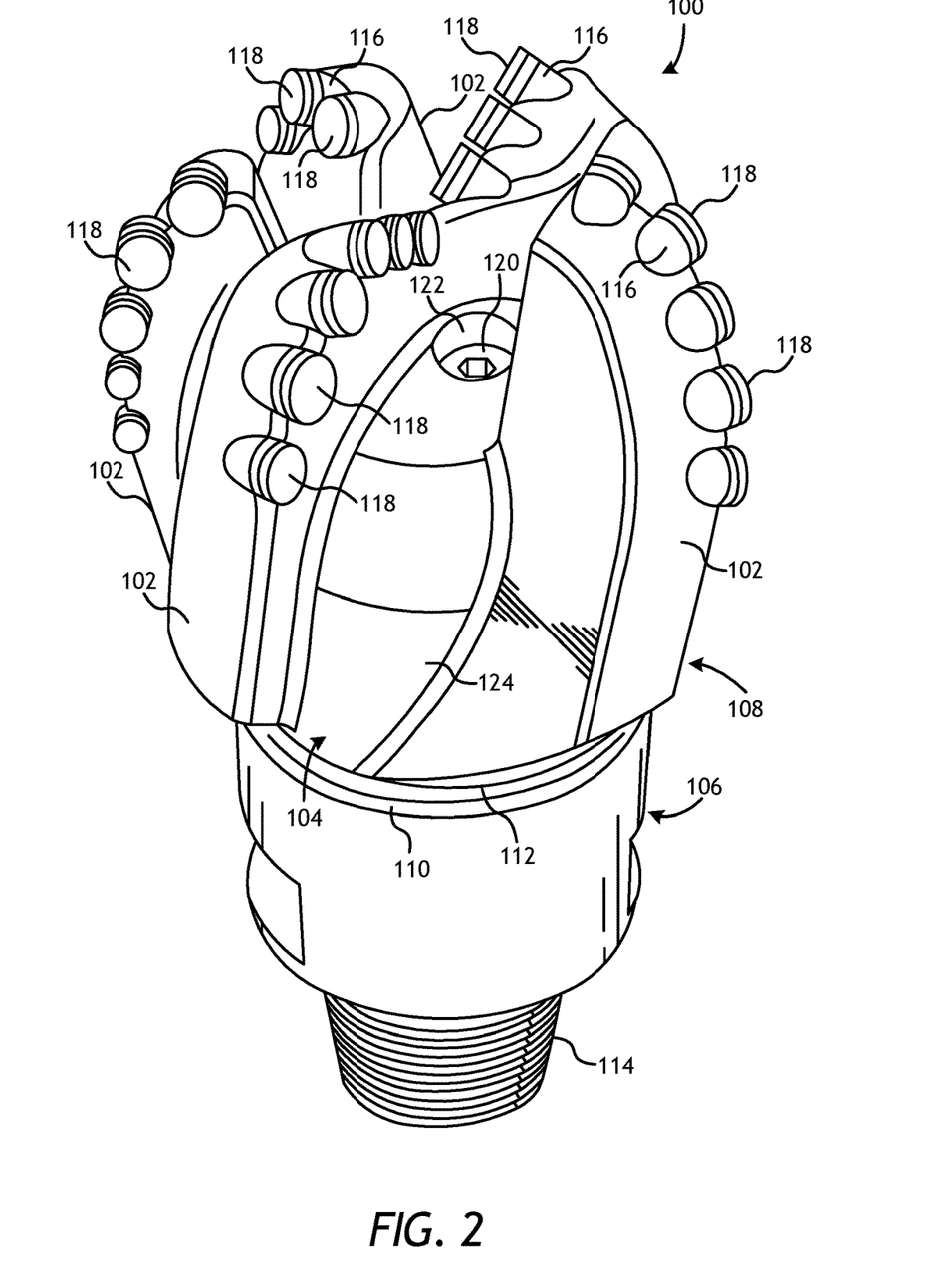
FIG. 2 is a perspective view of an exemplary drill bit that may be at least partially fabricated in accordance with the principles of the present disclosure.

Referring now to FIG. 2, illustrated is a perspective view of an exemplary drill bit 100 that may be fabricated, at least in part, in accordance with the principles of the present disclosure. More particularly, one or more portions of the drill bit 100 may be fabricated using the method 10 of FIG. 1. It will be appreciated, however, that discussion of the drill bit 100 may equally apply to any of the parts mentioned or described herein that may be used in the oil and gas industry or any other industry, without departing from the scope of the disclosure.

In some embodiments, all of the drill bit 100 may be fabricated using the method 10, but in other embodiments, only select portions of the drill bit 100 may be fabricated using the method 10. As illustrated in FIG. 2, the drill bit 100 may include or otherwise define a plurality of cutter blades 102 arranged along the circumference of a bit head 104. The bit head 104 is connected to a shank 106 to form a bit body 108. The shank 106 may be connected to the bit head 104 by welding, such as using laser arc welding that results in the formation of a weld 110 around a weld groove 112. The shank 106 may further include or otherwise be connected to a threaded pin 114, such as an American Petroleum Institute (API) drill pipe thread.

In the depicted example, the drill bit 100 includes five cutter blades 102, in which multiple recesses or pockets 116 are formed. Cutting elements 118 may be fixedly installed within each recess 116. This can be done, for example, by brazing each cutting element 118 into a corresponding recess 116. As the drill bit 100 is rotated in use, the cutting elements 118 engage the rock and underlying earthen materials, to dig, scrape or grind away the material of the formation being penetrated.

During drilling operations, drilling fluid or "mud" can be pumped downhole through a drill string (not shown) coupled to the drill bit 100 at the threaded pin 114. The drilling fluid circulates through and out of the drill bit 100 at one or more nozzles 120 positioned in nozzle openings 122 defined in the bit head 104. Junk slots 124 are formed between each adjacent pair of cutter blades 102. Cuttings, downhole debris, formation fluids, drilling fluid, etc., may pass through the junk slots 124 and circulate back to the well surface within an annulus formed between exterior portions of the drill string and the inner wall of the wellbore being drilled.

Figure 3:
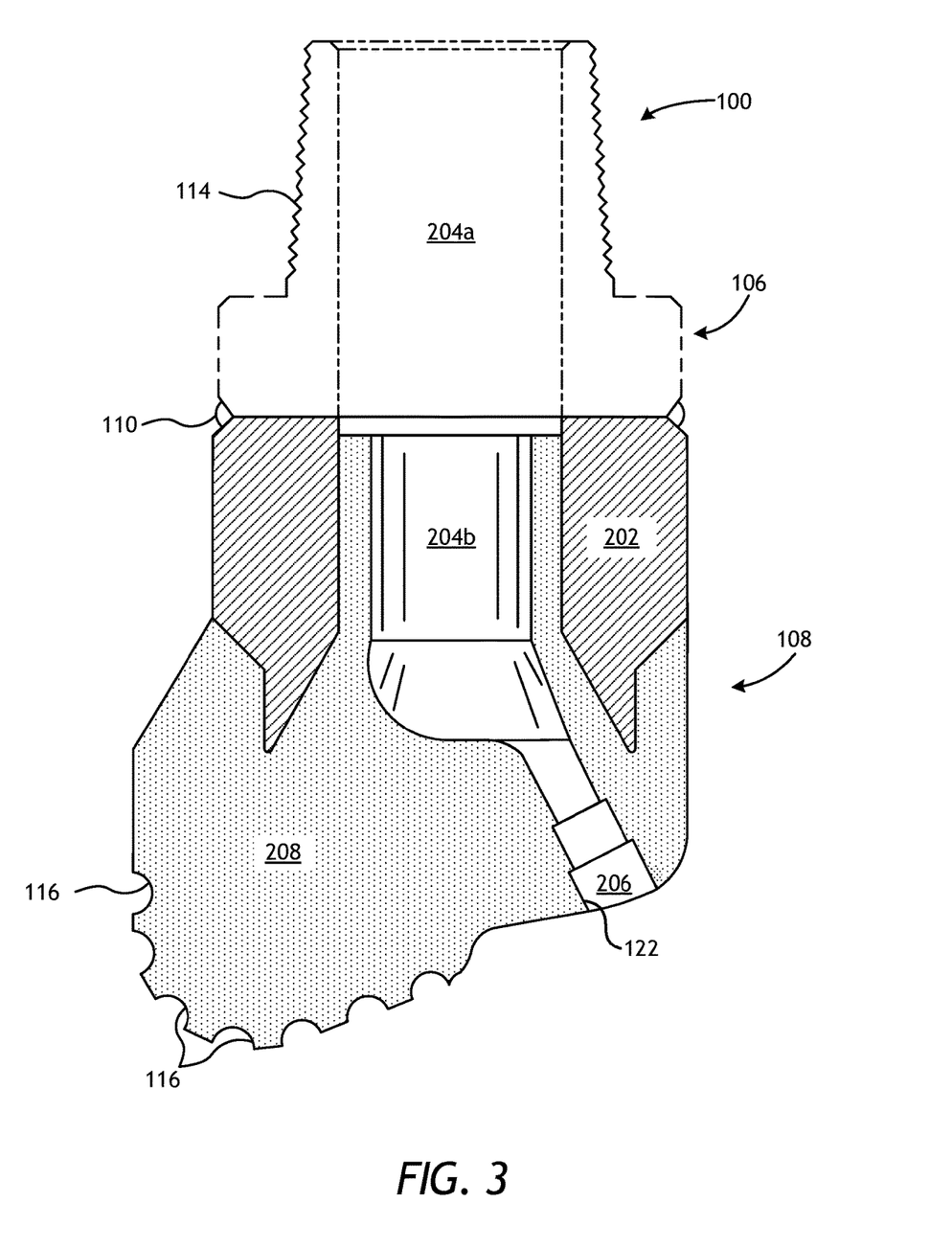
FIG. 3 is a cross-sectional view of the drill bit of FIG. 2.

FIG. 3 is a cross-sectional side view of the drill bit 100 of FIG. 2. Similar numerals from FIG. 2 that are used in FIG. 3 refer to similar components that are not described again. As illustrated, the shank 106 may be securely attached to a metal blank (or mandrel) 202 at the weld 110 and the metal blank 202 extends into the bit body 108. The shank 106 and the metal blank 202 are generally cylindrical structures that define corresponding fluid cavities 204a and 204b, respectively, in fluid communication with each other. The fluid cavity 204b of the metal blank 202 may further extend longitudinally into the bit body 108. At least one flow passageway 206 (one shown) may extend from the fluid cavity 204b to exterior portions of the bit body 108. The nozzle openings 122 (one shown in FIG. 2) may be defined at the ends of the flow passageways 206 at the exterior portions of the bit body 108. The pockets 116 are formed in the bit body 108 and are shaped or otherwise configured to receive the cutting elements 118 (FIG. 2). The bit body 108 may comprise a hard composite portion 208 and, in accordance with the teachings of the present disclosure, all or any portion of the hard composite portion 208 may be fabricated in accordance with the method of FIG. 1.

Figure 4:
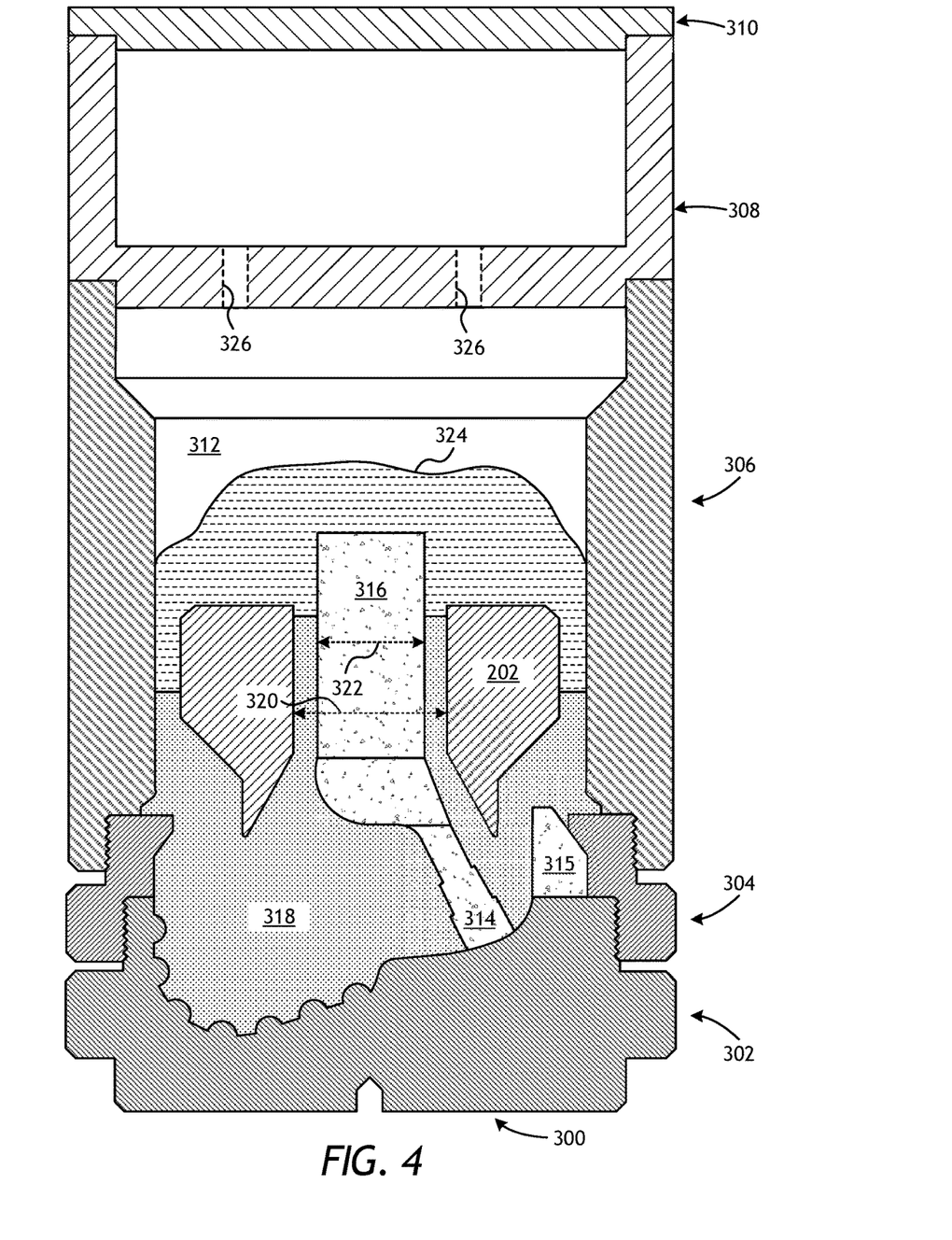
FIG. 4 is a cross-sectional side view of an exemplary mold assembly for use in forming the drill bit of FIG. 2.

FIG. 4 is a cross-sectional side view of a mold assembly 300 that may be used to form the drill bit 100 of FIGS. 2 and 3. While the mold assembly 300 is shown and discussed as being used to help fabricate the drill bit 100, those skilled in the art will readily appreciate that the mold assembly 300 and its several variations described herein may be used to help fabricate any of the downhole tools or parts mentioned above, without departing from the scope of the disclosure. As illustrated, the mold assembly 300 may include several components such as a mold 302, a gauge ring 304, and a funnel 306. In some embodiments, the funnel 306 may be operatively coupled to the mold 302 via the gauge ring 304, such as by corresponding threaded engagements, as illustrated. In other embodiments, the gauge ring 304 may be omitted from the mold assembly 300 and the funnel 306 may instead be operatively coupled directly to the mold 302, such as via a corresponding threaded engagement, without departing from the scope of the disclosure.

In some embodiments, as illustrated, the mold assembly 300 may further include a binder bowl 308 and a cap 310 placed above the funnel 306. The mold 302, the gauge ring 304, the funnel 306, the binder bowl 308, and the cap 310 may each be made of or otherwise comprise graphite or alumina ($Al_2O_3$), for example, or other suitable materials. An infiltration chamber 312 may be defined or otherwise provided within the mold assembly 300. Various techniques may be used to manufacture the mold assembly 300 and its components including, but not limited to, machining graphite blanks to produce the various components and thereby define the infiltration chamber 312 to exhibit a negative or reverse profile of desired exterior features of the drill bit 100 (FIGS. 2 and 3).

Materials, such as consolidated sand or graphite, may be positioned within the mold assembly 300 at desired locations to form various features of the drill bit 100 (FIGS. 2 and 3). For example, one or more nozzle displacements or legs 314 (one shown) may be positioned to correspond with desired locations and configurations of the flow passageways 206 (FIG. 3) and their respective nozzle openings 122 (FIGS. 2 and 3). One or more junk slot displacements 315 may also be positioned within the mold assembly 300 to correspond with the junk slots 124 (FIG. 2). Moreover, a cylindrically-shaped central displacement 316 may be placed on the legs 314. The number of legs 314 extending from the central displacement 316 will depend upon the desired number of flow passageways and corresponding nozzle openings 122 in the drill bit 100. Further, cutter-pocket displacements (shown as part of mold 302 in FIG. 4) may be placed in the mold 302 to form cutter pockets 116.

After the desired materials, including the central displacement 316 and the legs 314, have been installed within the mold assembly 300, reinforcement materials 318 may then be placed within or otherwise introduced into the mold assembly 300. The reinforcement materials 318 may include, for example, various types of reinforcing particles. Moreover, according to the present disclosure, the reinforcement materials 318 may include one or more ceramic or intermetallic workpieces fabricated in accordance with the method 10 of FIG. 1. The ceramic or intermetallic workpieces may prove advantageous in strengthening the bit body 108 (FIGS. 2 and 3) in select locations and, more particularly, strengthening the hard composite portion 208 (FIG. 3) thereof.

Suitable reinforcing particles include, but are not limited to, particles of metals, metal alloys, superalloys, intermetallics, borides, carbides, nitrides, oxides, ceramics, diamonds, and the like, or any combination thereof. More particularly, examples of reinforcing particles suitable for use in conjunction with the embodiments described herein may include particles that include, but are not limited to, tungsten, molybdenum, niobium, tantalum, rhenium, iridium, ruthenium, beryllium, titanium, chromium, rhodium, iron, cobalt, uranium, nickel, nitrides, silicon nitrides, boron nitrides, cubic boron nitrides, natural diamonds, synthetic diamonds, cemented carbide, spherical carbides, low-alloy sintered materials, cast carbides, silicon carbides, boron carbides, cubic boron carbides, molybdenum carbides, titanium carbides, tantalum carbides, niobium carbides, chromium carbides, vanadium carbides, iron carbides, tungsten carbides, macrocrystalline tungsten carbides, cast tungsten carbides, crushed sintered tungsten carbides, carburized tungsten carbides, steels, stainless steels, austenitic steels, ferritic steels, martensitic steels, precipitation-hardening steels, duplex stainless steels, ceramics, iron alloys, nickel alloys, cobalt alloys, chromium alloys, HASTELLOY® alloys (i.e., nickel-chromium containing alloys, available from Haynes International), INCONEL® alloys (i.e., austenitic nickel-chromium containing superalloys available from Special Metals Corporation), WASPALOYS® (i.e., austenitic nickel-based superalloys), RENE® alloys (i.e., nickel-chromium containing alloys available from Altemp Alloys, Inc.), HAYNES® alloys (i.e., nickel-chromium containing superalloys available from Haynes International), INCOLOY® alloys (i.e., iron-nickel containing superalloys available from Mega Mex), MP98T (i.e., a nickel-copper-chromium superalloy available from SPS Technologies), TMS alloys, CMSX® alloys (i.e., nickel-based superalloys available from C-M Group), cobalt alloy 6B (i.e., cobalt-based superalloy available from HPA), N-155 alloys, any mixture thereof, and any combination thereof. In some embodiments, the reinforcing particles may be coated. For example, by way of non-limiting example, the reinforcing particles may comprise diamond coated with titanium.

In some embodiments, the reinforcing particles described herein may have a diameter ranging from a lower limit of 1 micron, 10 microns, 50 microns, or 100 microns to an upper limit of 1000 microns, 800 microns, 500 microns, 400 microns, or 200 microns, wherein the diameter of the reinforcing particles may range from any lower limit to any upper limit and encompasses any subset therebetween.

The metal blank 202 may be supported at least partially by the reinforcement materials 318 within the infiltration chamber 312. More particularly, after a sufficient volume of the reinforcement materials 318 (including both reinforcing particles and one or more selectively placed ceramic or intermetallic workpieces) has been added to the mold assembly 300, the metal blank 202 may then be placed within mold assembly 300. The metal blank 202 may include an inside diameter 320 that is greater than an outside diameter 322 of the central displacement 316, and various fixtures (not expressly shown) may be used to position the metal blank 202 within the mold assembly 300 at a desired location. The reinforcement materials 318 may then be filled to a desired level within the infiltration chamber 312.

Binder material 324 may then be placed on top of the reinforcement materials 318, the metal blank 202, and the core 316. Suitable binder materials 324 include, but are not limited to, copper, nickel, cobalt, iron, aluminum, molybdenum, chromium, manganese, tin, zinc, lead, silicon, tungsten, boron, phosphorous, gold, silver, palladium, indium, any mixture thereof, any alloy thereof, and any combination thereof. Non-limiting examples of the binder material 324 may include copper-phosphorus, copper-phosphorous-silver, copper-manganese-phosphorous, copper-nickel, copper-manganese-nickel, copper-manganese-zinc, copper-manganese-nickel-zinc, copper-nickel-indium, copper-tin-manganese-nickel, copper-tin-manganese-nickel-iron, gold-nickel, gold-palladium-nickel, gold-copper-nickel, silver-copper-zinc-nickel, silver-manganese, silver-copper-zinc-cadmium, silver-copper-tin, cobalt-silicon-chromium-nickel-tungsten, cobalt-silicon-chromium-nickel-tungsten-boron, manganese-nickel-cobalt-boron, nickel-silicon-chromium, nickel-chromium-silicon-manganese, nickel-chromium-silicon, nickel-silicon-boron, nickel-silicon-chromium-boron-iron, nickel-phosphorus, nickel-manganese, copper-aluminum, copper-aluminum-nickel, copper-aluminum-nickel-iron, copper-aluminum-nickel-zinc-tin-iron, and the like, and any combination thereof. Examples of commercially-available binder materials 324 include, but are not limited to, VIRGIN™ Binder 453D (copper-manganese-nickel-zinc, available from Belmont Metals, Inc.), and copper-tin-manganese-nickel and copper-tin-manganese-nickel-iron grades 516, 519, 523, 512, 518, and 520 available from ATI Firth Sterling.

In some embodiments, the binder material 324 may be covered with a flux layer (not expressly shown). The amount of binder material 324 (and optional flux material) added to the infiltration chamber 312 should be at least enough to infiltrate the reinforcement materials 318 and, optionally, the one or more ceramic or intermetallic workpieces during the infiltration process. In some instances, some or all of the binder material 324 may be placed in the binder bowl 308, which may be used to distribute the binder material 324 into the infiltration chamber 312 via various conduits 326 that extend therethrough. The cap 310 (if used) may then be placed over the mold assembly 300. The mold assembly 300 and the materials disposed therein may then be preheated and then placed in a furnace (not shown). When the furnace temperature reaches the melting point of the binder material 324, the binder material 324 will liquefy and proceed to infiltrate the reinforcement materials 318.

After a predetermined amount of time allotted for the liquefied binder material 324 to infiltrate the reinforcement materials 318, the mold assembly 300 may then be removed from the furnace and cooled at a controlled rate. Once cooled, the mold assembly 300 may be broken away to expose the bit body 108 (FIGS. 2 and 3) that includes the hard composite portion 208 (FIG. 3). Subsequent processing according to well-known techniques may be used to finish the drill bit 100 (FIG. 2).

As mentioned above, along with reinforcing particles, one or more ceramic or intermetallic workpieces may also be included in the reinforcement materials 318 to be infiltrated by the binder material 324. The ceramic or intermetallic workpieces described herein may prove advantageous in reinforcing the hard composite portion 208 (FIG. 3) of the drill bit 100 of FIGS. 2 and 3 and thereby helping to increase strength, hardness, and/or erosion resistance, thereby resisting deflection, deformation, erosion, and/or abrasion during operation. Such properties may increase the lifetime of the drill bit 100 once in use.

The material or composition of the ceramic or intermetallic workpieces may bond with the binder material 324, so that an increased amount of thermal and mechanical stresses (or loads) can be transferred to the ceramic or intermetallic workpieces. Further, a composition that bonds with the binder material 324 may be less likely to pull out from the binder material 324 as a crack propagates. In some embodiments, the material or composition of the ceramic or intermetallic workpieces may be designed to endure temperatures and pressures experienced when forming the hard composite portion 208 (FIG. 3) with little to no alloying with the binder material 324 or oxidation. In yet other instances, the atmospheric conditions may be altered (e.g., reduced oxygen content achieved via reduced pressures or gas purge or vacuum) to mitigate oxidation of the ceramic or intermetallic workpieces and thereby enhance bonding between the ceramic or intermetallic workpieces and the binder. Such atmospheric conditions may allow for a binder composition that may not be suitable for use in standard atmospheric oxygen concentrations.

As indicated and discussed above, the ceramic or intermetallic workpieces may be fabricated to exhibit any desired shape, configuration, and size, depending primarily on the fabrication capabilities of the selected additive manufacturing technique used to initially fabricate the porous metallic workpieces. In the present embodiment of fabricating the drill bit 100 (FIGS. 2 and 3), the ceramic or intermetallic workpieces may positioned in select regions of the hard composite portion 208 (FIG. 3) prior to infiltration. For instance, in at least one embodiment, a ceramic or intermetallic workpiece may be positioned in each blade 102 (FIG. 2) region to provide structural reinforcement and erosion-resistance. In other embodiments, one or more ceramic or intermetallic workpieces may be arranged or otherwise positioned to form the cutter pockets 116 (FIGS. 2 and 3). In yet other embodiments, the entire bit body 108 (FIGS. 2 and 3) may comprise a single ceramic or intermetallic workpiece to be infiltrated by the binder material 324. In further embodiments, one or more ceramic or intermetallic workpieces may be arranged or otherwise positioned to form a macroscopic reinforcing structure that connects at least one of the blades to at least one other blade (e.g., a gear-like shape positioned with teeth protruding into each blade).

Figure 5:
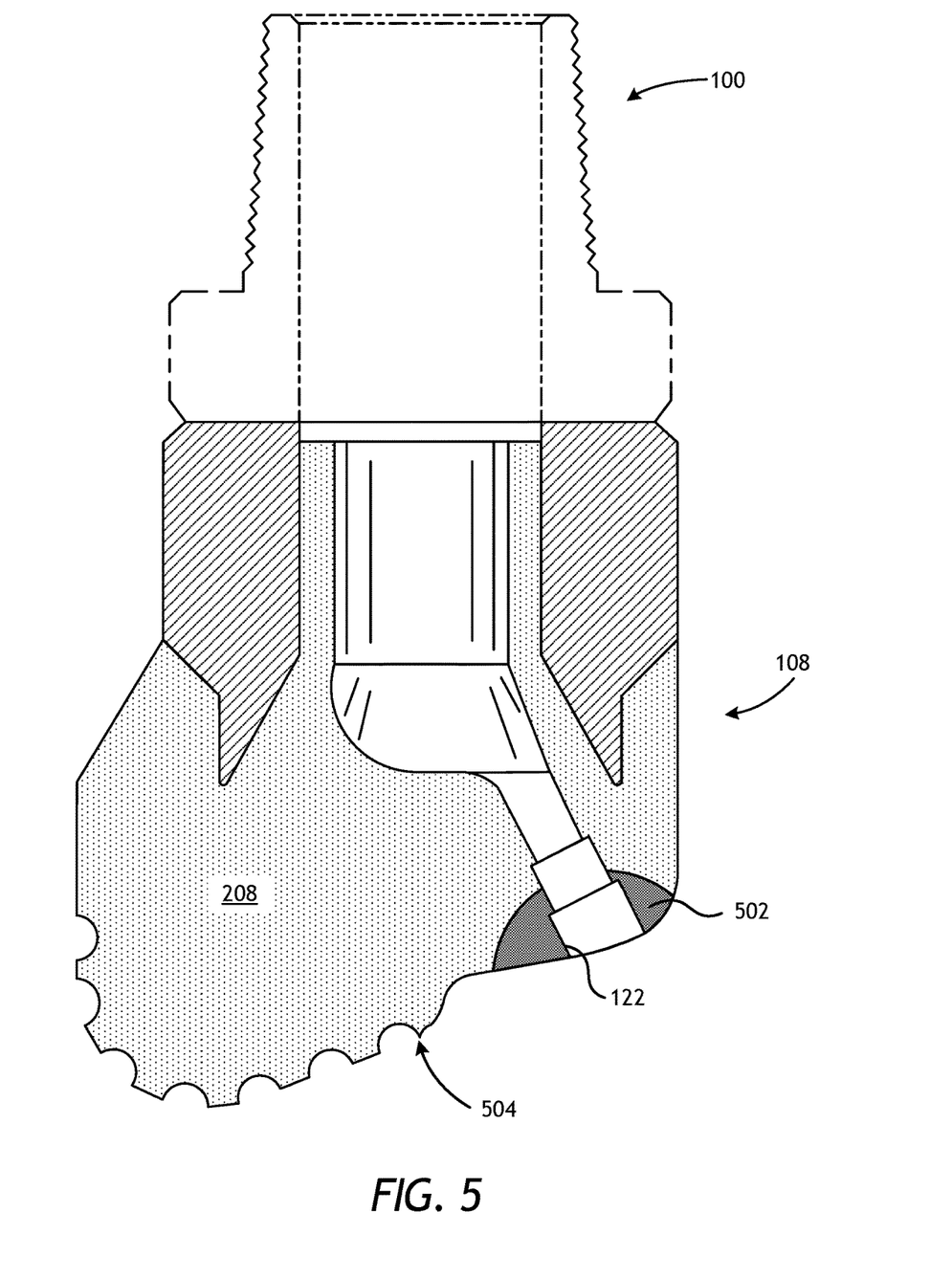
FIG. 5 is a cross-sectional side view of the drill bit of FIG. 2 as comprising a hard composite portion and one or more localized ceramic or intermetallic workpieces.
Figure 6:
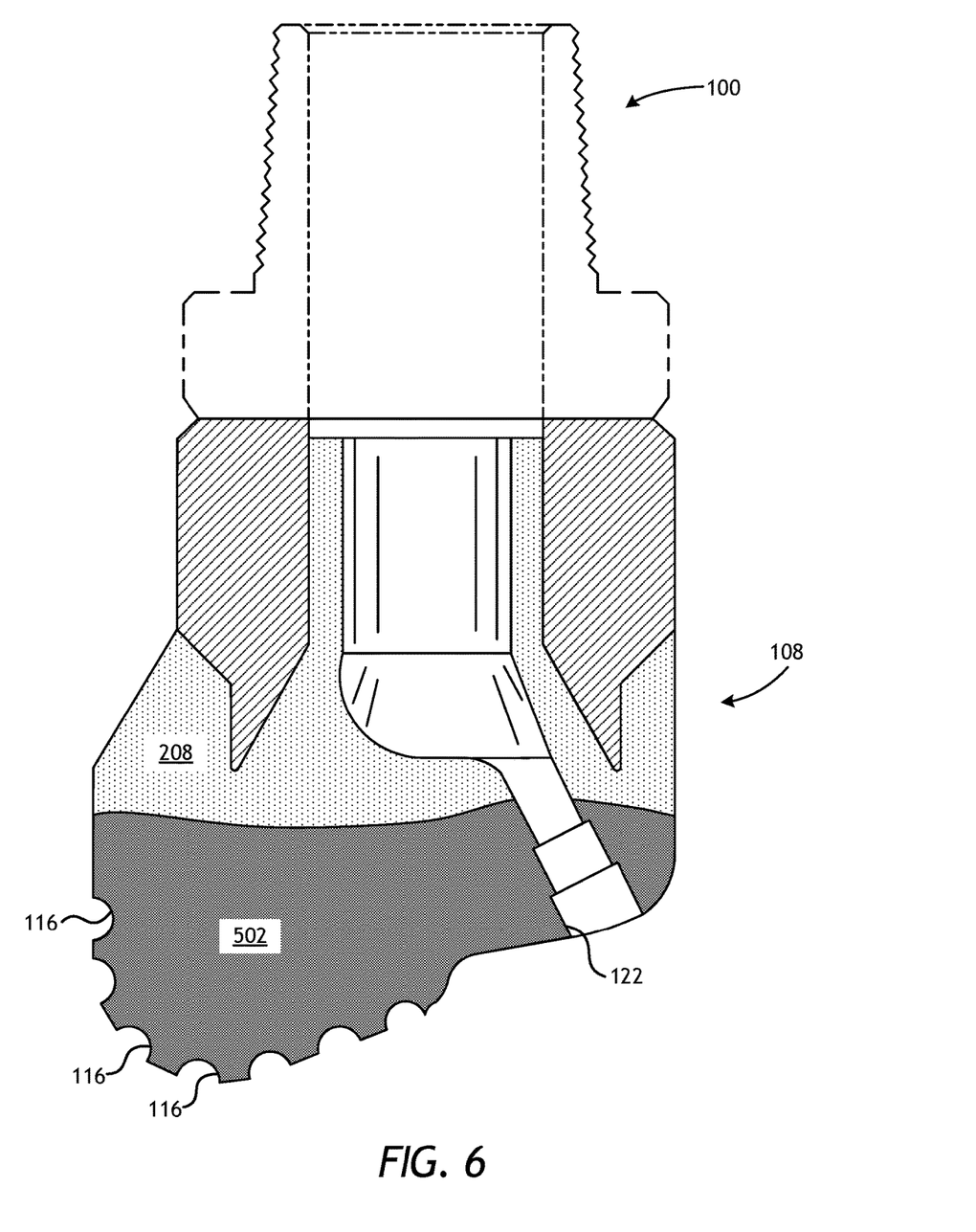
FIG. 6 is a cross-sectional side view of the drill bit of FIG. 2 as comprising a hard composite portion and a ceramic or intermetallic workpiece.
Figure 7:
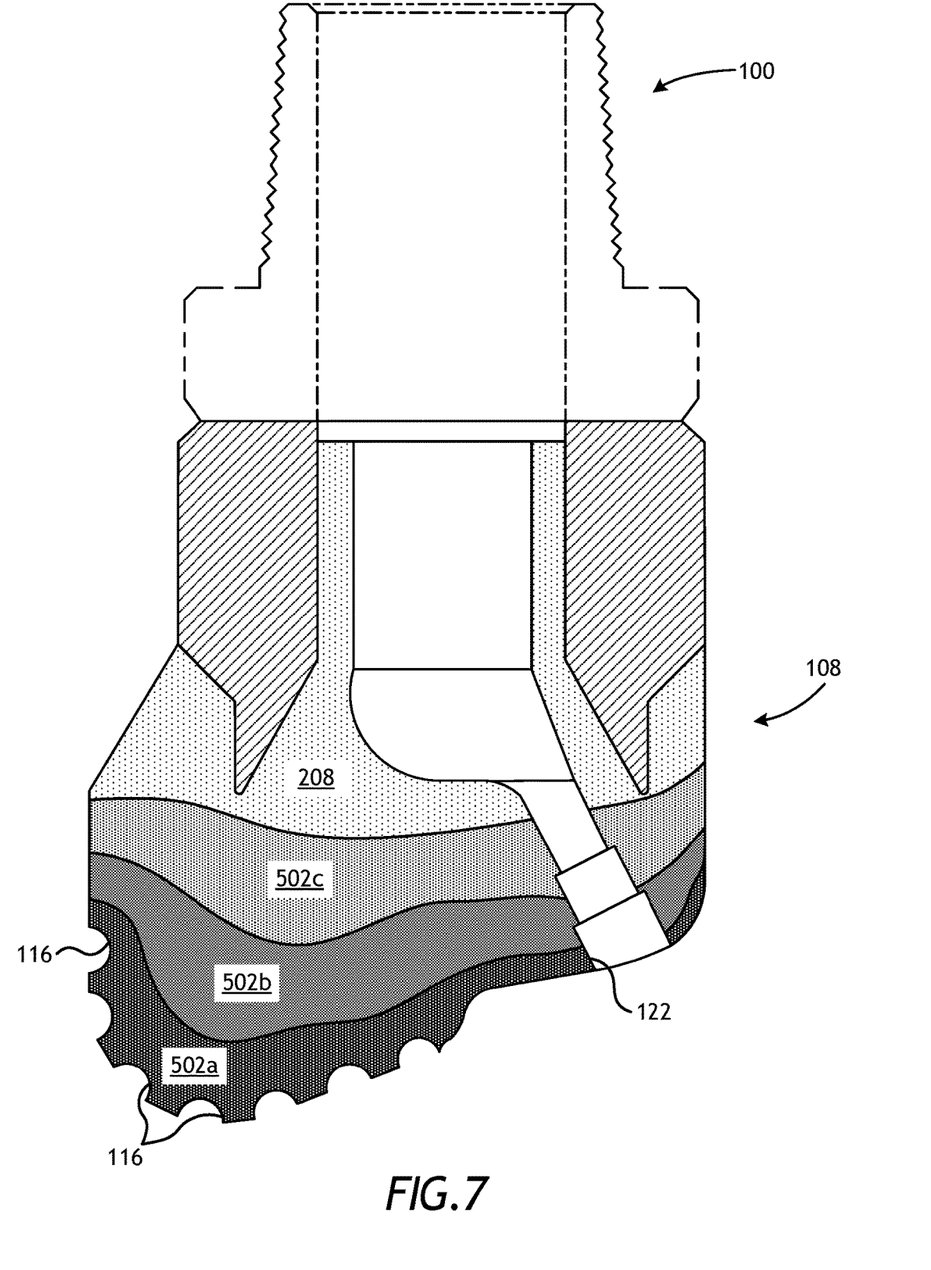
FIG. 7 is a cross-sectional view of the drill bit of FIG. 2 as comprising a hard composite portion and multiple ceramic or intermetallic workpieces.

By way of nonlimiting illustration, FIGS. 5-7 provide examples of implementing ceramic or intermetallic workpieces described herein into the bit body 108 of the drill bit 100 of FIGS. 2 and 3. One skilled in the art will readily recognize how to adapt these teachings to other types of composite (i.e., MMC) tools or parts in keeping with the scope of the disclosure. In some embodiments, placement of the ceramic or intermetallic workpieces within the bit body 108 or the hard composite portion 208 may be localized. Localization, in some instances, may provide enhanced strength and stiffness and may reduce the erosion properties of the drill bit 100.

FIG. 5, for example, illustrates a cross-sectional side view of the drill bit 100 as comprising the hard composite portion 208 and one or more localized ceramic or intermetallic workpieces 502, according to one or more embodiments. As illustrated, the ceramic or intermetallic workpiece(s) 502 may be localized in the bit body 108 in one or more locations with the remaining portion of the bit body 108 being formed by the hard composite portion 208 (e.g., comprising binder material 324 and reinforcing particles without the ceramic or intermetallic workpiece(s) 502). The localized ceramic or intermetallic workpiece(s) 502 is shown in FIG. 5 as being located proximal the nozzle openings 122 and generally at an apex 504 of the drill bit 100, two areas of the bit body 108 that may benefit from structural reinforcement. As used herein, the term "apex" refers to the central portion of the exterior surface of the bit body 108 that engages the formation during drilling and generally at or near where the cutter blades 102 (FIG. 1) meet on the exterior surface of the bit body 108 to engage the formation during drilling. As will be appreciated, localization of the ceramic or intermetallic workpiece(s) 502 may help mitigate crack initiation and propagation, while also manipulating the erosion properties of the bit body 108 because of the lower concentration of reinforcing particles at the localized areas.

As another example, FIG. 6 illustrates a cross-sectional side view of the drill bit 100 as comprising the hard composite portion 208 and one or more localized ceramic or intermetallic workpieces 502, according to one or more embodiments. In the illustrated embodiments, the ceramic or intermetallic workpiece(s) 502 may comprise a monolithic structure or it may denote a region that is reinforced with mesoscale reinforcing structures or workpieces. As illustrated, the ceramic or intermetallic workpiece(s) 502 may be located proximal the nozzle openings 122 and the pockets 116, and otherwise encompassing the blades 102 (FIG. 1) and/or the center of the bit body 108. In some embodiments, the porosity of the ceramic or intermetallic workpiece(s) 502 may change in concentration, geometry, or both along radial, circumferential, and/or longitudinal directions. Similar to localization, changing the concentration, geometry, or both of the ceramic or intermetallic workpiece(s) 502 may, in some instances, be used to enhance strength and stiffness and further to maintain suitable erosion resistance.

FIG. 7 illustrates a cross-sectional side view of the drill bit 100 as comprising the hard composite portion 208 and multiple ceramic or intermetallic workpieces 502, according to one or more embodiments. The workpieces 502 illustrated in FIG. 7 may be monolithic structures or they may denote regions reinforced with mesoscale reinforcing structures or workpieces. More particularly, the ceramic or intermetallic workpieces 502 are shown to be located proximal the nozzle openings 122 and the pockets 116 in separate layers or workpieces 502a, 502b, and 502c. The porosity of the workpieces 502a-c may vary from one another and/or within themselves so as to vary the mechanical properties of the bit body 108 following infiltration. For instance, the porosity of the first workpiece 502a may be greater than the porosity of the second workpiece 502b, which may be greater than the porosity of the third workpiece 502c. Accordingly, the first workpiece 502a may be harder than the third workpiece 502c following infiltration. Advantageously, the first workpiece 502a is depicted as being located proximal the nozzle openings 122 and the pockets 116 to provide increased erosion-resistance. One skilled in the art will readily recognize the various configurations and locations for the workpieces 502a-c (including varying concentrations, geometries, and sizes) that would be suitable for producing a bit body 108, and a resultant drill bit 100, that has a reduced propensity to have cracks initiate and propagate.

Figure 8:
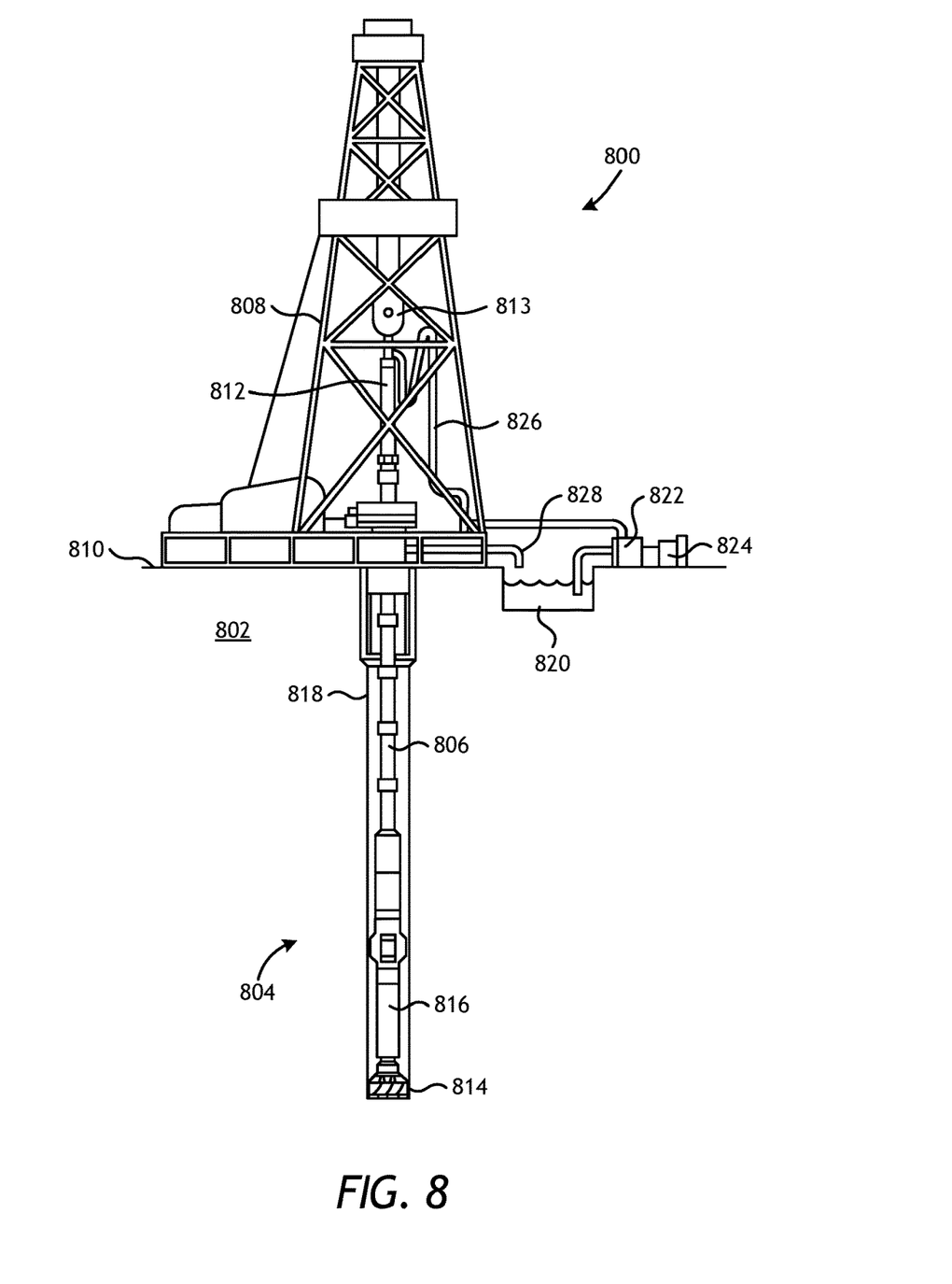
FIG. 8 is a schematic drawing showing one example of a drilling assembly suitable for use in conjunction with the drill bits of the present disclosure.

Referring now to FIG. 8, illustrated is an exemplary drilling system 800 that may employ one or more principles of the present disclosure. Boreholes may be created by drilling into the earth 802 using the drilling system 800. The drilling system 800 may be configured to drive a bottom hole assembly (BHA) 804 positioned or otherwise arranged at the bottom of a drill string 806 extended into the earth 802 from a derrick 808 arranged at the surface 810. The derrick 808 includes a kelly 812 and a traveling block 813 used to lower and raise the kelly 812 and the drill string 806.

The BHA 804 may include a drill bit 814 operatively coupled to a tool string 816 which may be moved axially within a drilled wellbore 818 as attached to the drill string 806. The drill bit 814 may be fabricated and otherwise created in accordance with the principles of the present disclosure and, more particularly, using one or more ceramic or intermetallic workpieces infiltrated into the bit body 108. During operation, the drill bit 814 penetrates the earth 802 and thereby creates the wellbore 118. The BHA 804 provides directional control of the drill bit 814 as it advances into the earth 802. The tool string 816 can be semi-permanently mounted with various measurement tools (not shown) such as, but not limited to, measurement-while-drilling (MWD) and logging-while-drilling (LWD) tools, that may be configured to take downhole measurements of drilling conditions. In other embodiments, the measurement tools may be self-contained within the tool string 816, as shown in FIG. 9.

Fluid or "mud" from a mud tank 820 may be pumped downhole using a mud pump 822 powered by an adjacent power source, such as a prime mover or motor 824. The mud may be pumped from the mud tank 820, through a stand pipe 826, which feeds the mud into the drill string 806 and conveys the same to the drill bit 814. The mud exits one or more nozzles arranged in the drill bit 814 and in the process cools the drill bit 814. After exiting the drill bit 814, the mud circulates back to the surface 810 via the annulus defined between the wellbore 818 and the drill string 806, and in the process returns drill cuttings and debris to the surface. The cuttings and mud mixture are passed through a flow line 828 and are processed such that a cleaned mud is returned down hole through the stand pipe 826 once again.

Although the drilling system 800 is shown and described with respect to a rotary drill system in FIG. 9, those skilled in the art will readily appreciate that many types of drilling systems can be employed in carrying out embodiments of the disclosure. For instance, drills and drill rigs used in embodiments of the disclosure may be used onshore (as depicted in FIG. 1) or offshore (not shown). Offshore oil rigs that may be used in accordance with embodiments of the disclosure include, for example, floaters, fixed platforms, gravity-based structures, drill ships, semi-submersible platforms, jack-up drilling rigs, tension-leg platforms, and the like. It will be appreciated that embodiments of the disclosure can be applied to rigs ranging anywhere from small in size and portable, to bulky and permanent.

Further, although described herein with respect to oil drilling, various embodiments of the disclosure may be used in many other applications. For example, disclosed methods can be used in drilling for mineral exploration, environmental investigation, natural gas extraction, underground installation, mining operations, water wells, geothermal wells, and the like. Further, embodiments of the disclosure may be used in weight-on-packers assemblies, in running liner hangers, in running completion strings, etc., without departing from the scope of the disclosure.

Embodiments disclosed herein include:

A. A part that includes a three-dimensional porous metallic workpiece printed via an additive manufacturing process and subsequently subjected to a diffusion-based process to convert at least a portion of the porous metallic workpiece to a ceramic workpiece or an intermetallic workpiece.

B. A method of manufacturing a part that includes printing a three-dimensional porous metallic workpiece via an additive manufacturing process, and subjecting the porous metallic workpiece to a diffusion-based process and thereby converting at least a portion of the porous metallic workpiece to a ceramic workpiece or an intermetallic workpiece, wherein the porous metallic workpiece comprises a metal or a metal alloy that forms one of a carbide, a nitride, a boride, an oxide, a silicide, or an intermetallic upon being subjected to a reaction atmosphere of the diffusion-based process.

C. A method of fabricating a drill bit that includes positioning one or more ceramic or intermetallic workpieces into a mold assembly that defines at least a portion of an infiltration chamber, wherein each ceramic or intermetallic workpiece is made by printing a three-dimensional porous metallic workpiece via an additive manufacturing process, and subjecting the porous metallic workpiece to a diffusion-based process and thereby converting at least a portion of the porous metallic workpiece to a ceramic workpiece or an intermetallic workpiece, wherein the porous metallic workpiece comprises a metal or a metal alloy that forms one of a carbide, a nitride, a boride, an oxide, a silicide, or an intermetallic upon being subjected to a reaction atmosphere of the diffusion-based process. The method further including depositing reinforcing materials into the infiltration chamber, and infiltrating the one or more ceramic or intermetallic workpieces and the reinforcing materials with a binder material and thereby producing a composite.

Each of embodiments A, B, and C may have one or more of the following additional elements in any combination: Element 1: wherein the additive manufacturing process is selected from the group consisting of laser sintering, laser melting, electron-beam melting, laser metal deposition, fused deposition modeling, fused filament fabrication, selective laser sintering, stereolithography, laminated object manufacturing, polyjet, and any combination thereof. Element 2: wherein the part is selected from the group consisting of an oilfield drill bit or cutting tool, a non-retrievable drilling component, an aluminum drill bit body, a drill-string stabilizer, a cone for a roller-cone drill bit, a model for forging dies, an arm for a fixed reamer, an arm for an expandable reamer, an internal component associated with an expandable reamer, a sleeve attachable to an uphole end of a rotary drill bit, a rotary steering tool, a logging-while-drilling tool, a measurement-while-drilling tool, a side-wall coring tool, a fishing spear, a washover tool, a rotor, a stator and/or housing for a downhole drilling motor, a blade for a downhole turbine, armor plating, an automotive component, a bicycle frame, a brake fin, an aerospace component, a turbopump component, a screen, a filter, a porous catalyst and any combination thereof. Element 3: wherein the porous metallic workpiece comprises a metal or a metal alloy that forms one of a carbide, a nitride, a boride, an oxide, a silicide, or an intermetallic upon being subjected to a reaction atmosphere of the diffusion-based process. Element 4: wherein the metal is selected from the group consisting of aluminum, antimony, barium, beryllium, bismuth, boron, cadmium, calcium, cerium, cesium, chromium, cobalt, copper, erbium, europium, gadolinium, gallium, germanium, hafnium, holmium, indium, iron, lanthanum, lead, lutetium, lithium, magnesium, manganese, molybdenum, neodymium, nickel, niobium, osmium, palladium, platinum, potassium, praseodymium, rhenium, rhodium, rubidium, ruthenium, samarium, scandium, silicon, sodium, strontium, tantalum, tellurium, terbium, thulium, tin, titanium, tungsten, vanadium, yttrium, ytterbium, zinc, and zirconium. Element 5: wherein the metal alloy is an alloy resulting from the combination of at least two metals selected from the group consisting of aluminum, antimony, barium, beryllium, bismuth, boron, cadmium, calcium, cerium, cesium, chromium, cobalt, copper, erbium, europium, gadolinium, gallium, germanium, hafnium, holmium, indium, iron, lanthanum, lead, lutetium, lithium, magnesium, manganese, molybdenum, neodymium, nickel, niobium, osmium, palladium, platinum, potassium, praseodymium, rhenium, rhodium, rubidium, ruthenium, samarium, scandium, silicon, sodium, strontium, tantalum, tellurium, terbium, thulium, tin, titanium, tungsten, vanadium, yttrium, ytterbium, zinc, and zirconium. Element 6: wherein some or all of the metallic workpiece is subjected to the reaction atmosphere during the diffusion-based process, the reaction atmosphere comprising a media selected from the group consisting of methane, air, oxygen, endogas, exogas, nitrogen, ammonia, charcoal, carbon, graphite, nitriding salts, boron, silicon, a vaporized metal, a molten metal, and any combination thereof. Element 7: wherein the ceramic workpiece or the intermetallic workpiece is infiltrated with a binder material to produce a composite. Element 8: wherein the binder material is a material selected from the group consisting of copper, nickel, cobalt, iron, aluminum, molybdenum, chromium, manganese, tin, zinc, lead, silicon, tungsten, boron, phosphorous, gold, silver, palladium, indium, titanium, vanadium, zirconium, niobium, hafnium, tantalum, rhenium, ruthenium, osmium, iridium, and alloy thereof.

Element 9: further comprising infiltrating the ceramic workpiece or the intermetallic workpiece with a binder material and thereby producing a composite. Element 10: wherein infiltrating the ceramic workpiece or the intermetallic workpiece with a binder material comprises liquefying the binder material, and infiltrating at least a portion of a porous network of the ceramic workpiece or the intermetallic workpiece with a liquefied binder material. Element 11: further comprising penetrating at least a portion of a porous network of the porous metallic workpiece with a media of the reaction atmosphere, wherein the media is selected from the group consisting of methane, air, oxygen, endogas, exogas, nitrogen, ammonia, charcoal, carbon, graphite, nitriding salts, boron, silicon, a vaporized metal, a molten metal, and any combination thereof. Element 12: wherein subjecting the porous metallic workpiece to the diffusion-based process comprises masking at least a portion of the porous metallic workpiece and thereby preventing a media of the reaction atmosphere from accessing at least a portion of the porous metallic workpiece. Element 13: further comprising terminating the diffusion-based process prematurely to prevent a media of the reaction atmosphere from accessing at least a portion of the porous metallic workpiece.

Element 14: wherein infiltrating the one or more ceramic or intermetallic workpieces with the binder material comprises liquefying the binder material, and infiltrating at least a portion of a porous network of the one or more ceramic or intermetallic workpieces with a liquefied binder material. Element 15: further comprising penetrating at least a portion of a porous network of the porous metallic workpiece with a media of the reaction atmosphere, wherein the media is selected from the group consisting of methane, air, oxygen, endogas, exogas, nitrogen, ammonia, charcoal, carbon, graphite, nitriding salts, boron, silicon, a vaporized metal, a molten metal, and any combination thereof. Element 16: wherein infiltrating the one or more ceramic or intermetallic workpieces with the binder material comprises infiltrating the one or more ceramic or intermetallic workpieces with a binder material selected from the group consisting of copper, nickel, cobalt, iron, aluminum, molybdenum, chromium, manganese, tin, zinc, lead, silicon, tungsten, boron, phosphorous, gold, silver, palladium, indium, titanium, vanadium, zirconium, niobium, hafnium, tantalum, rhenium, ruthenium, osmium, iridium, and alloy thereof. Element 17: wherein the mold assembly defines one or more cutter pockets, and wherein positioning the one or more ceramic or intermetallic workpieces into the mold assembly comprises positioning the one or more ceramic or intermetallic workpieces adjacent or near the one or more cutter pockets. Element 18: wherein the mold assembly defines one or more blade regions, and wherein positioning the one or more ceramic or intermetallic workpieces into the mold assembly comprises positioning at least one ceramic or intermetallic workpiece into each blade region.

By way of non-limiting example, exemplary combinations applicable to A, B, and C include: Element 3 with Element 4; Element 3 with Element 5; Element 3 with Element 6; Element 7 with Element 8; and Element 9 with Element 10.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method, comprising:
    extending a drill string into a wellbore from a drilling platform, the drill string having a drill bit attached to an end thereof; and
    circulating a drilling fluid to the drill bit and through the wellbore with a pump fluidly connected to the drill string,
    wherein the drill bit is manufactured by:
        positioning one or more ceramic or intermetallic workpieces into a mold assembly that defines at least a portion of an infiltration chamber, each ceramic or intermetallic workpiece being fabricated by:
            printing a three-dimensional porous metallic workpiece via an additive manufacturing process; and
            subjecting the porous metallic workpiece to a diffusion-based process and thereby converting at least a portion of the porous metallic workpiece to a ceramic workpiece or an intermetallic workpiece, wherein the porous metallic workpiece comprises a metal or a metal alloy that forms a carbide, upon being subjected to a reaction atmosphere of the diffusion-based process;
        depositing reinforcing materials into the infiltration chamber; and
        infiltrating the one or more ceramic or intermetallic workpieces and the reinforcing materials with a binder material and thereby producing a composite, wherein a bit body of the drill bit includes a hard composite portion and the one or more ceramic or intermetallic workpieces are localized proximal to a nozzle opening or an apex of the drill bit.

2. The method of claim 1, wherein the additive manufacturing process is selected from the group consisting of laser sintering, laser melting, electron-beam melting, laser metal deposition, fused deposition modeling, fused filament fabrication, selective laser sintering, stereolithography, laminated object manufacturing, polyj et, and any combination thereof.

3. The method of claim 1, wherein the metal is selected from the group consisting of aluminum, antimony, barium, beryllium, bismuth, boron, cadmium, calcium, cerium, cesium, chromium, cobalt, copper, erbium, europium, gadolinium, gallium, germanium, hafnium, holmium, indium, iron, lanthanum, lead, lutetium, lithium, magnesium, manganese, molybdenum, neodymium, nickel, niobium, osmium, palladium, platinum, potassium, praseodymium, rhenium, rhodium, rubidium, ruthenium, samarium, scandium, silicon, sodium, strontium, tantalum, tellurium, terbium, thulium, tin, titanium, tungsten, vanadium, yttrium, ytterbium, zinc, and zirconium.

4. The method of claim 1, wherein the metal alloy is an alloy resulting from the combination of at least two metals selected from the group consisting of aluminum, antimony, barium, beryllium, bismuth, boron, cadmium, calcium, cerium, cesium, chromium, cobalt, copper, erbium, europium, gadolinium, gallium, germanium, hafnium, holmium, indium, iron, lanthanum, lead, lutetium, lithium, magnesium, manganese, molybdenum, neodymium, nickel, niobium, osmium, palladium, platinum, potassium, praseodymium, rhenium, rhodium, rubidium, ruthenium, samarium, scandium, silicon, sodium, strontium, tantalum, tellurium, terbium, thulium, tin, titanium, tungsten, vanadium, yttrium, ytterbium, zinc, and zirconium.

5. The method of claim 1, wherein some or all of the porous metallic workpiece is subjected to the reaction atmosphere during the diffusion-based process, the reaction atmosphere comprising a media selected from the group consisting of methane, air, oxygen, endogas, exogas, nitrogen, ammonia, charcoal, carbon, graphite, nitriding salts, boron, silicon, a vaporized metal, a molten metal, and any combination thereof.

6. The method of claim 1, further comprising penetrating at least a portion of a porous network of the porous metallic workpiece with a media of the reaction atmosphere, wherein the media is selected from the group consisting of methane, air, oxygen, endogas, exogas, nitrogen, ammonia, charcoal, carbon, graphite, nitriding salts, boron, silicon, a vaporized metal, a molten metal, and any combination thereof.

7. The method of claim 1, wherein the binder material is a material selected from the group consisting of copper, nickel, cobalt, iron, aluminum, molybdenum, chromium, manganese, tin, zinc, lead, silicon, tungsten, boron, phosphorous, gold, silver, palladium, indium, titanium, vanadium, zirconium, niobium, hafnium, tantalum, rhenium, ruthenium, osmium, iridium, and alloy thereof.

8. The method of claim 1, wherein infiltrating the ceramic workpiece or the intermetallic workpiece with a binder material comprises:
liquefying the binder material; and
infiltrating at least a portion of a porous network of the ceramic workpiece or the intermetallic workpiece with a liquefied binder material.

9. The method of claim 1, wherein subjecting the porous metallic workpiece to the diffusion-based process comprises masking at least a portion of the porous metallic workpiece and thereby preventing a media of the reaction atmosphere from accessing at least a portion of the porous metallic workpiece.

10. The method of claim 1, wherein the mold assembly defines one or more cutter pockets, and wherein positioning the one or more ceramic or intermetallic workpieces into the mold assembly comprises positioning the one or more ceramic or intermetallic workpieces adjacent or near the one or more cutter pockets.

11. The method of claim 1, wherein the mold assembly defines one or more blade regions, and wherein positioning the one or more ceramic or intermetallic workpieces into the mold assembly comprises positioning at least one ceramic or intermetallic workpiece into each blade region.

* * * * *